United States Patent
Howarth et al.

(10) Patent No.: US 12,228,086 B1
(45) Date of Patent: Feb. 18, 2025

(54) TORCH ACTIVE CONTROL SYSTEM

(71) Applicant: Solar Turbines Incorporated, San Diego, CA (US)

(72) Inventors: David W. Howarth, La Mesa, CA (US); Felipe Ochoa, Murrieta, CA (US); Terry R. Tarver, Saratoga Springs, UT (US); Hernan Fernandez, Córdoba (AR); Trey Taylor, Waxahachie, TX (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/515,074

(22) Filed: Nov. 20, 2023

(51) Int. Cl.
*F02C 9/28* (2006.01)
*F02C 7/232* (2006.01)
*F02C 7/264* (2006.01)

(52) U.S. Cl.
CPC .............. *F02C 9/28* (2013.01); *F02C 7/232* (2013.01); *F02C 7/264* (2013.01); *F05D 2240/35* (2013.01)

(58) Field of Classification Search
CPC ............ F02C 5/00; F02C 5/0211; F02C 5/12; F02C 7/264; F02C 7/266; F02C 7/22; F02C 7/232; F23R 3/343; F05D 2240/35; F05D 2260/99; F05D 2220/32; F23N 2227/00; F23N 2227/36
See application file for complete search history.

(56) References Cited

U.S. PATENT DOCUMENTS

| | | | | |
|---|---|---|---|---|
| 3,006,144 A | * | 10/1961 | Arnett et al. | F02C 9/16 73/861.74 |
| 4,259,932 A | * | 4/1981 | Hideg | F02B 53/10 123/220 |
| 7,966,801 B2 | * | 6/2011 | Umeh | F23R 3/50 60/776 |
| 10,711,699 B2 | * | 7/2020 | Dam | F23R 3/343 |
| 10,830,156 B2 | | 11/2020 | Cano Wolff et al. | |
| 11,242,807 B2 | | 2/2022 | Beckmann et al. | |
| 11,543,130 B1 | * | 1/2023 | Ryon | F02C 7/264 |
| 11,549,441 B1 | * | 1/2023 | Ryon | F23Q 7/26 |

(Continued)

FOREIGN PATENT DOCUMENTS

| | | | | |
|---|---|---|---|---|
| CN | 117462966 A | * | 1/2024 | ............. F23K 5/005 |
| EP | 3594475 A1 | * | 1/2020 | ............... F02C 7/14 |

(Continued)

*Primary Examiner* — Craig Kim

(57) ABSTRACT

Even if the fuel pressure to a torch for igniting an air-fuel mixture in a gas turbine engine is set to an ideal value, the actual fuel pressure supplied to the torch may differ due to modifications, drift, changes in ambient temperature or pressure, fuel composition, and/or the like. This may result in failure of the gas turbine engine to ignite. Accordingly, disclosed embodiments introduce a torch active pressure control (TAPC) system into the flow path of fuel to the torch. The TAPC system is controlled to modulate the fuel pressure of the fuel supplied to the torch, according to a modulation profile. The modulation profile may traverse a range of fuel pressures in each of one or a plurality of sinusoidal, V-shaped, stepped, or other-shaped cycles, to increase the probability that the ideal fuel pressure, and therefore, flame height, is achieved, thereby increasing the likelihood of a successful lightoff.

20 Claims, 7 Drawing Sheets

(56) References Cited

U.S. PATENT DOCUMENTS

| | | | | |
|---|---|---|---|---|
| 11,566,565 B2 * | 1/2023 | Ryon | ...................... | F23R 3/343 |
| 11,608,783 B2 * | 3/2023 | Ryon | ...................... | F23R 3/005 |
| 11,635,027 B2 * | 4/2023 | Ryon | ...................... | F23Q 9/00 |
| | | | | 60/740 |
| 11,674,445 B2 * | 6/2023 | Ryon | ...................... | F23R 3/283 |
| | | | | 60/39.821 |
| 11,674,446 B2 * | 6/2023 | Ryon | ...................... | F23R 3/283 |
| | | | | 60/39.821 |
| 11,692,488 B2 * | 7/2023 | Ryon | ...................... | F02C 7/18 |
| | | | | 60/39.826 |
| 11,719,162 B2 * | 8/2023 | Ryon | ...................... | F23R 3/005 |
| | | | | 60/39.821 |
| 11,754,289 B2 * | 9/2023 | Ryon | ...................... | F02C 7/266 |
| | | | | 60/734 |
| 11,773,784 B2 * | 10/2023 | Ryon | ...................... | F23R 3/12 |
| | | | | 60/776 |
| 11,913,646 B2 * | 2/2024 | Ryon | ...................... | F23R 3/343 |
| 2008/0134684 A1 * | 6/2008 | Umeh | ...................... | F02C 9/46 |
| | | | | 60/39.281 |
| 2017/0082035 A1 * | 3/2017 | Geiger | ...................... | F02C 9/263 |
| 2019/0010872 A1 * | 1/2019 | Dam | ...................... | F02C 7/264 |
| 2019/0056110 A1 * | 2/2019 | Stevens | ...................... | F23R 3/286 |
| 2019/0063747 A1 * | 2/2019 | Mollmann | ............... | F01D 25/04 |
| 2019/0186746 A1 * | 6/2019 | Lowery | ...................... | F02M 27/06 |
| 2021/0215100 A1 * | 7/2021 | Head | ...................... | F23R 3/045 |
| 2022/0099050 A1 * | 3/2022 | Tyler | ...................... | F02D 19/027 |
| 2022/0154932 A1 * | 5/2022 | Ryon | ...................... | F02C 9/40 |
| 2023/0092811 A1 * | 3/2023 | Palmer | ...................... | F02C 3/22 |
| | | | | 60/39.281 |
| 2023/0348083 A1 * | 11/2023 | Skilton | ...................... | F02C 9/40 |

FOREIGN PATENT DOCUMENTS

| | | | | |
|---|---|---|---|---|
| JP | H10288098 A | | 10/1998 | |
| JP | 2000356168 A | | 12/2000 | |
| WO | WO-2022098677 A1 * | | 5/2022 | ............ B64D 27/24 |

* cited by examiner

TORCH ACTIVE CONTROL SYSTEM

TECHNICAL FIELD

The embodiments described herein are generally directed to gas turbine engines, and, more particularly, to a control system for a torch used to ignite an air-fuel mixture in a gas turbine engine.

BACKGROUND

A gas turbine engine may utilize a variety of systems for starting the engine. The term "ignition" is typically used to refer to the commencement of the start operation, whereas the term "lightoff" typically refers to the time at which the combustor reaches a temperature that exceeds a threshold temperature known to represent successfully lit fuel injectors in the combustor. For ignition, many gas turbine engines utilize a device, typically referred to as a "torch," that introduces a flame directly into the combustor to light the fuel injectors.

One of the primary problems with using a torch is the varying penetration of the torch flame into the combustor. The flame penetration is primarily a function of the pressure of the fuel supplied to the torch. Typically, this fuel pressure is determined by a pressure reducing regulator installed upstream from the torch. For example, Japanese Patent Reference No. JP4631725B2, Chinese Patent Reference No. CN102537983B, and U.S. Patent Pub. No. 2021/0215100A1 describe systems for regulating fuel pressure to ignition systems. However, if the setting of the pressure reducing regulator is inadvertently modified or drifts, if the ambient temperature or pressure changes, and/or if the composition of the fuel varies significantly over time, the penetration of the torch flame may be too low or too high, which can result in a failure of the combustor to achieve lightoff.

The present disclosure is directed toward overcoming this and other problems discovered by the inventors.

SUMMARY

In an embodiment, a system comprises: one or more torches; at least one torch active pressure control (TAPC) system in a fluid communication with at least one of the one or more torches, wherein the TAPC system is configured to set a fuel pressure of fuel that is supplied to the at least one torch; and a controller configured to actuate the at least one TAPC system to modulate the fuel pressure that is supplied to the at least one torch, according to a modulation profile.

In an embodiment, a method, for igniting an air-fuel mixture in a combustor, comprises, by at least one controller, for each of one or more torches configured to produce a flame that penetrates into a combustion chamber of the combustor: energizing the torch; modulating a fuel pressure of fuel that is supplied to the torch, according to a modulation profile; detecting whether or not lightoff has been achieved in the combustor; and when detecting that the lightoff has been achieved in the combustor, shutting off the torch.

In an embodiment, a system comprises: a plurality of torches each configured to produce a flame that penetrates into a combustion chamber of a combustor; a plurality of torch active pressure control (TAPC) systems, wherein each of the plurality of TAPC systems is in fluid communication with a respective one of the plurality of torches, and wherein each of the plurality of TAPC systems is configured to set a fuel pressure of fuel that is supplied to the respective torch; and at least one controller configured to actuate each of the plurality of TAPC systems to energize the respective torch, modulate a fuel pressure of fuel that is supplied to the respective torch, according to a modulation profile, detect whether or not lightoff has been achieved in the combustor; and when detecting that the lightoff has been achieved in the combustor, shut off the respective torch.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
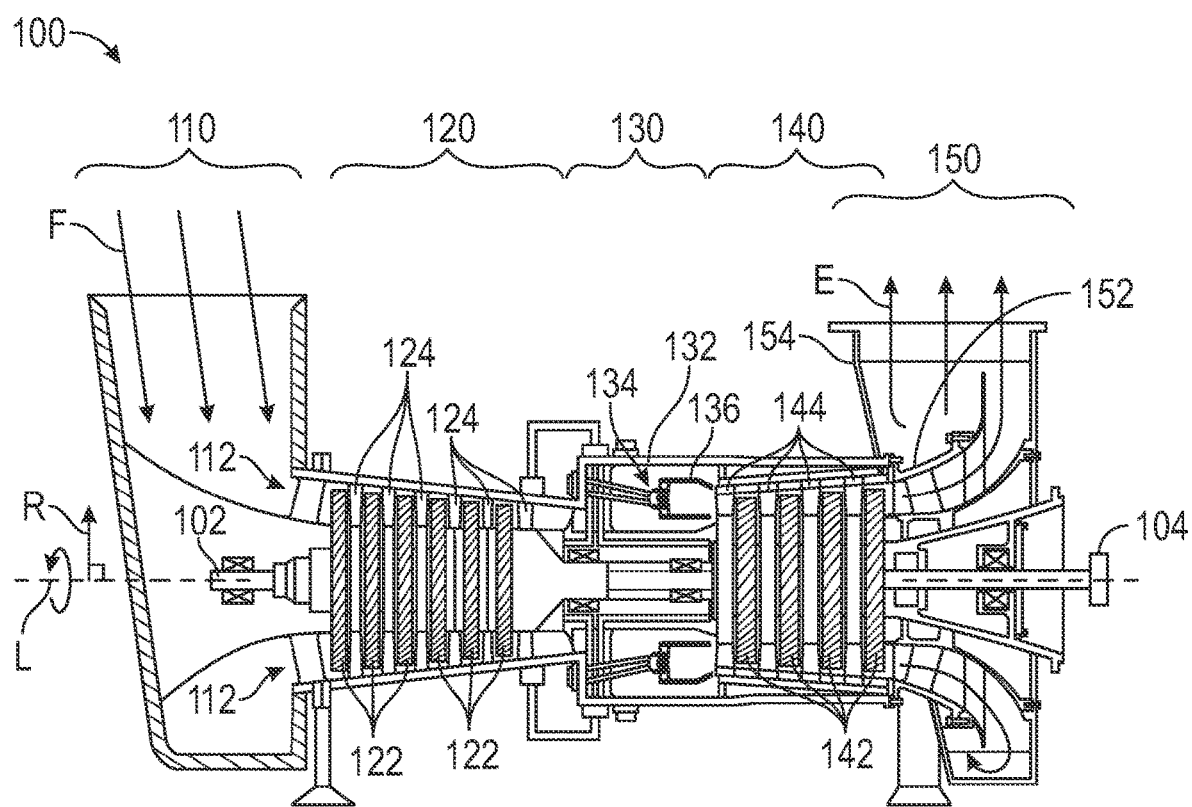
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

References herein to "upstream" and "downstream" or "forward" and "aft" are relative to the flow direction of the primary gas (e.g., air or fuel) being discussed, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). In addition, the terms "respective" and "respectively" signify an association between members of a group of first components and members of a group of second components. For example, the phrase "each component A connected to a respective component B" would signify A1 connected to B1, A2 connected to B2, . . . and AN connected to BN.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular around longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer to or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
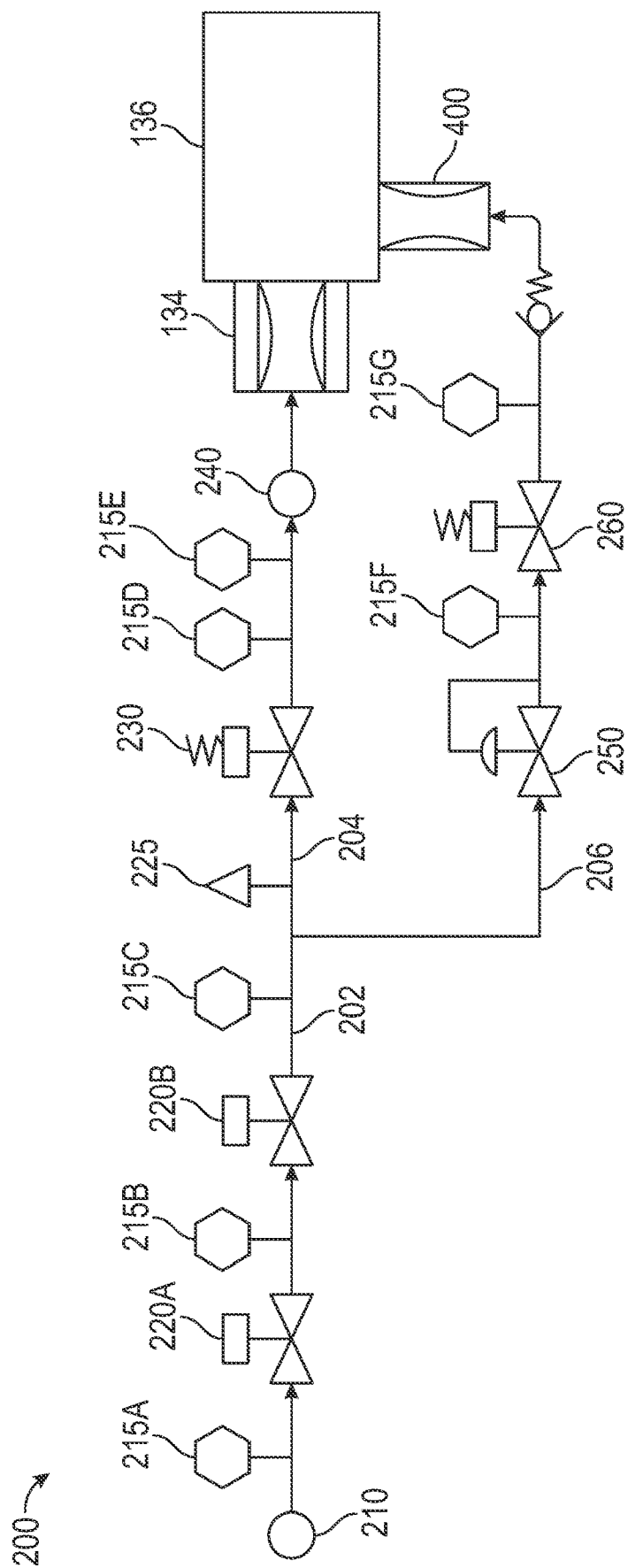
FIG. 2 illustrates a schematic diagram of a system used for gaseous fuel delivery and ignition, according to an embodiment.

FIG. 2 illustrates a schematic diagram of a system 200 used for gaseous fuel delivery and ignition, according to an embodiment. In the illustrated embodiment, system 200 is supplied with fuel via an inlet 210. The fuel flows along a fuel path 202 through one or more fuel shutoff valves 220, illustrated as primary fuel shutoff valve 220A and secondary fuel shutoff valve 220B, before branching into a first fuel path 204 to one or more fuel injectors 134 and a second fuel path 206 to one or more torches 400. It should be understood that fuel path 202 may consist of any number of fuel shutoff valves 220, including no fuel shutoff valves 220, one fuel shutoff valve 220, and three or more fuel shutoff valves 220, depending on the particular design.

On first fuel path 204, the fuel may flow through one or more fuel control valves 230, through a fuel manifold 240, to fuel injector(s) 134. It should be understood that first fuel path 204 may consist of any number of fuel control valves 230, including one, two, three, or more fuel control valves 230. In an embodiment in which the first fuel path comprises a plurality of fuel control valves 230, the plurality of fuel control valves 230 may be arranged in parallel (e.g., along a plurality of paths through respective manifolds 240 to a single fuel injector 134 or respective fuel injectors 134) or in serial. For example, first fuel path 204 may be divided into a normal path for operation with no emissions control and a low-emissions path for operation with emissions control (e.g., SoLoNOx™ control, offered by Solar Turbines Inc. of San Diego, California), with each path comprising a respective fuel control valve 230 and fuel manifold 240, and feeding a one-passage or two-passage fuel injector 134. Typically, gas turbine engine 100 will comprise a plurality of fuel injectors 134, arranged annularly around longitudinal axis L of gas turbine engine 100. All of these fuel injectors 134 may be supplied with fuel via first fuel path 204.

On second fuel path 206, the fuel may flow through a pressure reducing regulator 250, which may coarsely regulate the fuel pressure in second fuel path 206. Pressure reducing regulator 250 may comprise a valve that controls the pressure of fuel flowing out of pressure reducing regulator 250 towards torch 400. In particular, pressure reducing regulator 250 may reduce the fuel pressure, relative to the fuel pressure along fuel path 202 (and being supplied to fuel injector(s) 134 along first fuel path 204), to a fuel pressure that is more suitable for torch 400. As an example, pressure reducing regulator 250 may output the fuel at a pressure of 90-110 pound per square inch in gauge (psig), or approximately 100 psig. The fuel, output by pressure reducing regulator 250, flows through a torch active pressure control (TAPC) system 260, prior to reaching torch 400.

TAPC system 260 may be configured to set a fuel pressure of fuel that is supplied to torch 400, in real time. Thus, TAPC system 260 can modulate the pressure of fuel supplied to torch 400 according to a modulation profile that traverses a range of fuel pressures at a particular frequency. With respect to legacy systems, TAPC system 260 may assume responsibility for shutoff to torch 400 and fine control of the fuel pressure.

TAPC system 260 may comprise a flow control valve and an actuator that controls a position of the flow control valve. The input of the flow control valve may be in fluid communication with the output of pressure reducing regulator 250, and the outlet of the flow control valve may be in fluid communication with an inlet of torch 400. A controller may control the actuator to modulate the pressure of the fuel exiting the flow control valve, according to the modulation profile. The flow control valve may be a globe valve comprising a disc at the end of a stem that is actuated up or down to regulate the flow of fuel through TAPC system 260. The globe valve may be actuated by a pneumatic actuator or other mechanism that can shift (e.g., translate) the stem up and down. As one example, TAPC system 260 may comprise any of the fractional flow control valves, including the Mark 708x series or 8000 series of pneumatic control valves, offered by LowFlow Valve of Cincinnati, Ohio. However, TAPC system 260 may comprise any system that is capable of continuously or continually modulating the pressure of a fluid.

System 200 may also comprise various sensors to measure one or more parameters, including pressure, along the fuel paths 202, 204, and 206. In particular, system 200 may comprise a plurality of pressure sensors 215, illustrated as pressure sensors 215A, 215B, 215C, 215D, 215E, 215F, and 215G, which measure the fuel pressure at various points. For example, pressure sensor 215F measures the fuel pressure between pressure reducing regulator 250 and TAPC system 260, and pressure sensor 215G measures the fuel pressure between TAPC system 260 and torch 400. The measured pressure from pressure sensor 215G may be used as feedback, during control of TAPC system 260, to precisely control the pressure of fuel, supplied to torch 400, according to the modulation profile, in a closed-loop control process. System 200 may also comprise one or more resistance temperature detectors 225 and/or other sensors.

In an embodiment, system 200 comprises a plurality of torches 400, such as two torches 400. The plurality of torches 400 may be spaced apart around the circumference of combustor case 132 to produce a flame that penetrates radially into combustion chamber 136 (i.e., towards longitudinal axis L), downstream from an annular arrangement of fuel injectors 134 (e.g., sixteen fuel injectors 134). In a particular embodiment that consists of two torches 400, the pair of torches 400 may be positioned in the bottom hemisphere of combustor case 132, spaced apart by between 40-80 degrees of the circumference of combustor case 132, and mirrored across a plane that includes longitudinal axis L and bisects the space between the pair of torches 400.

In an embodiment that utilizes a plurality of torches 400, each torch 400 may be supplied fuel from the same TAPC system 260 or from a separate respective TAPC system 260. In the case that each torch 400 is supplied fuel by the same TAPC system 260, the modulation profiles will be identical. In the alternative case, in which each torch 400 is supplied fuel by a separate respective TAPC system 260, the modulation profile for each torch 400 may be the same as or differ from the modulation profile for one or more other torches 400. In this alternative case, the modulation profiles may have different shapes and/or frequencies, or may have identical shapes and/or frequencies but be shifted in phase relative to each other. As used herein, the term "same" with respect to the modulation profile refers to a modulation profile that has the same shape, frequency, and phase as another modulation profile, whereas the term "different" with respect to a modulation profile refers to a modulation profile that differs in either shape, frequency, and/or phase from another modulation profile.

Figure 3A:
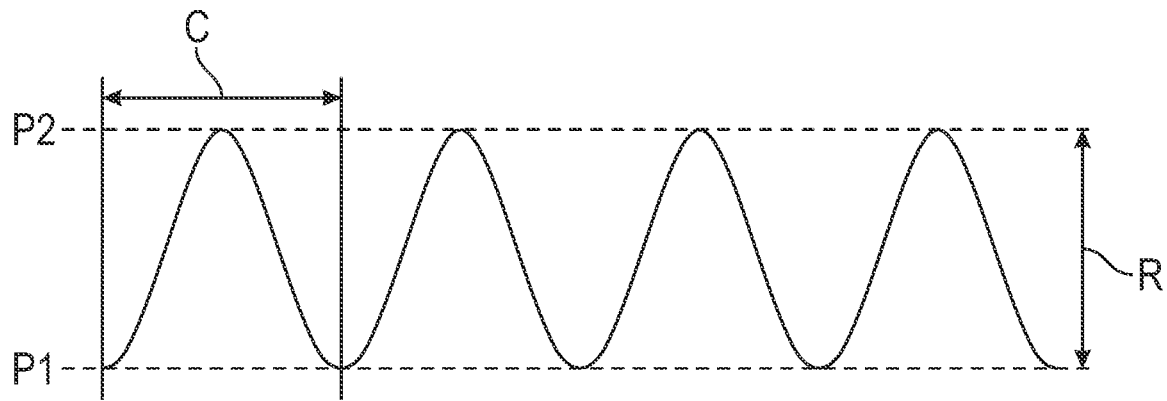
FIGS. 3A-3C illustrate examples of modulation profiles, according to alternative embodiments.
Figure 3B:
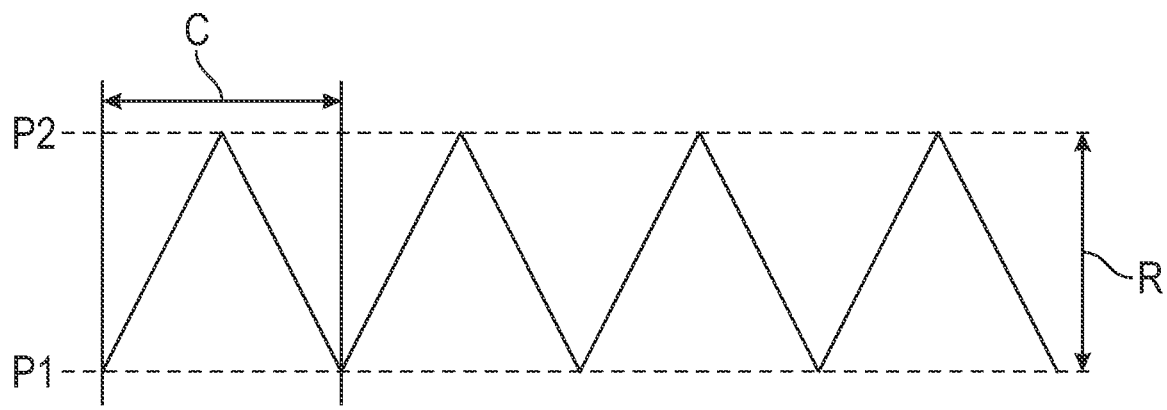
Figure 3C:
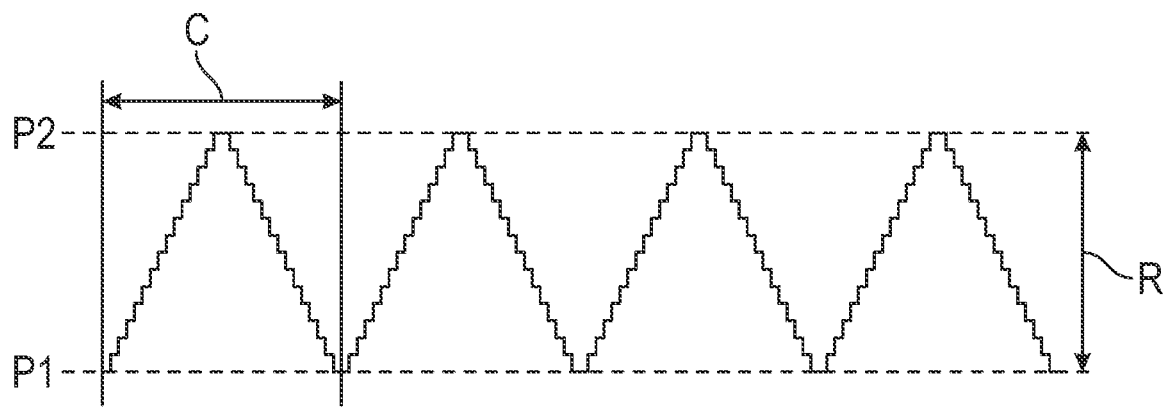

FIGS. 3A-3C illustrate examples of modulation profiles, according to alternative embodiments. It should be understood that these are simply examples, and that a modulation profile may have other shapes, including hybrids or composites or the illustrated shapes. Generally, each modulation profile may vary the fuel pressure from one end of a range R of fuel pressures to the opposite end of the range R of fuel pressures, such that the fuel pressure traverses the range R of fuel pressures at least once, and preferably, a plurality of times, according to a frequency. It should be understood that, conceptually, a modulation profile may define a potentially infinite sequence of these traversals, referred to herein as "cycles," at a given frequency, but that in practice, modulation of the fuel pressure by TAPC system 260, according to the modulation profile, will be finite (e.g., ending after lightoff or expiration of an ignition timer). The range R of fuel pressures may be defined by a first pressure P1 at the bottom of the range R and a second pressure P2 at the top of the range R. As an example of range R, P1 may be 20 psig, and P2 may be 100 psig, such that the range R has a width of 80 psig.

FIG. 3A illustrates a modulation profile that is sinusoidal, according to a first embodiment. In each cycle C, the fuel pressure smoothly increases from the bottom P1 of the range R towards the top P2 of the range R, the rate of change decreases as the fuel pressure nears the top P2 of the range R until reaching zero and changing direction at or above the top P2 of the range R, then the rate of change increases and the fuel pressure smoothly decreases from the top P2 of the range R towards the bottom of the range R, and finally the rate of change decreases as the fuel pressure nears the bottom P1 of the range R until reaching zero and changing direction at or below the bottom P1 of the range R.

FIG. 3B illustrates a modulation profile that is V-shaped, according to a second embodiment. In each cycle C, the fuel pressure linearly increases from the bottom P1 of the range R towards the top P2 of the range R, then the rate of change sharply changes direction at or above the top P2 of the range R, and the fuel pressure linearly decreases from the top P2 of the range R towards the bottom P1 of the range R, at which point the rate of change sharply changes direction again at or below the bottom P1 of the range R.

FIG. 3C illustrates a modulation profile that is stepped, according to a third embodiment. In each cycle C, the fuel pressure increases in a plurality of upward steps from the bottom P1 of the range R towards the top P2 of the range R, then the rate of change changes direction at or above the top P2 of the range R, and the fuel pressure decreases in a plurality of downward steps from the top P2 of the range R towards the bottom P1 of the range R, at which point the rate of change changes direction again at or below the bottom P1 of the range R. Each step in the stepped modulation profile is illustrated as an instantaneous change in fuel pressure at a time point, followed by no change in the fuel pressure over a period of time. However, more generally, a step may comprise any first rate of change in the fuel pressure over any first time period, followed by any second rate of change in the fuel pressure over any second time period, where the second rate of change differs from (e.g., is less than) the first rate of change. In the illustrated example, the first rate of change is non-zero, and the second rate of change is zero.

It should be understood that the above three embodiments are non-limiting examples. In practice, the modulation profile may comprise any shape, including composites of the aforementioned cycles C. For example, the modulation profile could comprise a mixture of one or more sinusoidal cycles C, one or more V-shaped cycles C, one or more stepped cycles C, and/or one or more cycles C having other shapes. Cycles C with differing shapes may be alternated over cycle periods, may be summed to produce a composite shape in each cycle period, may traverse different ranges R in different cycle periods, and/or the like. More generally, modulation profile comprise any shape that traverses a range R of fuel pressures at least once.

Figure 4:
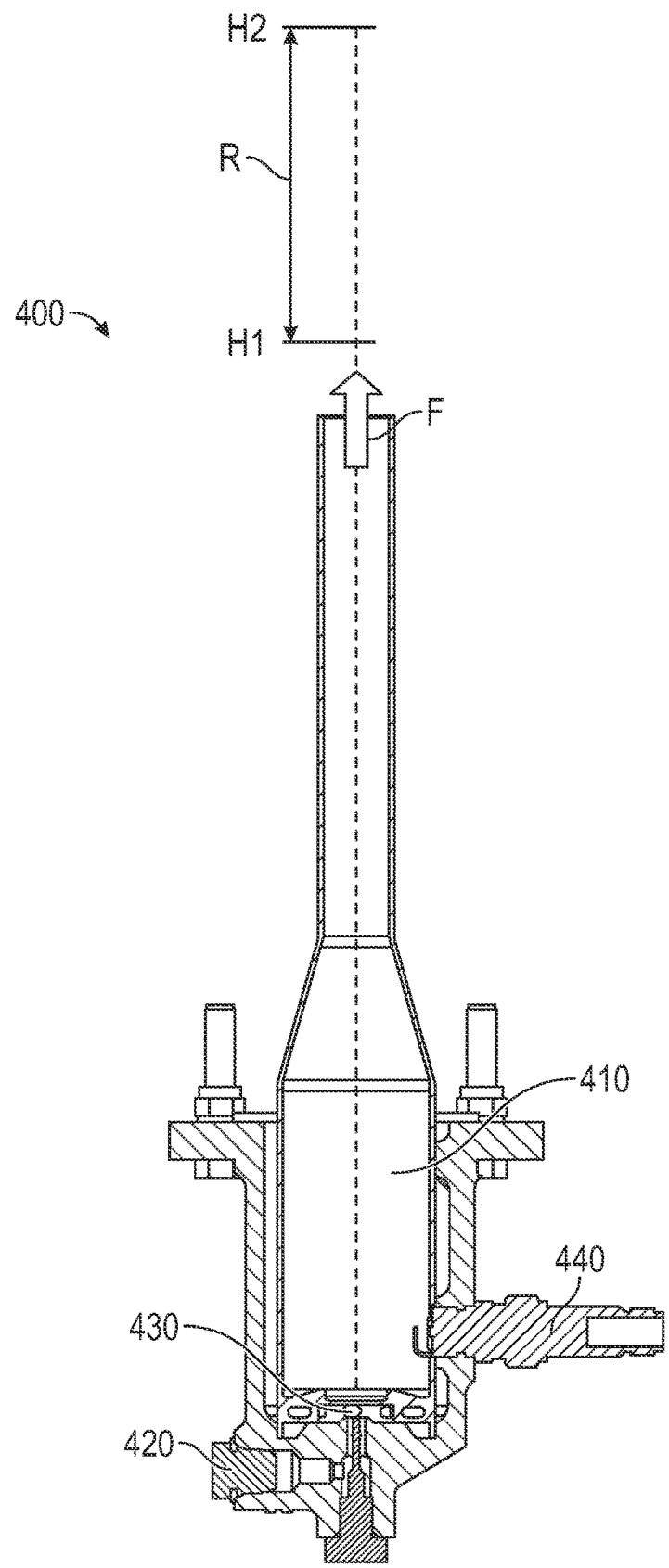
FIG. 4 illustrates a cross-sectional view of a torch, according to an embodiment.

FIG. 4 illustrates a cross-sectional view of a torch 400, according to an embodiment. Torch 400 may comprise a chamber 410, which is supplied with fuel, via a fuel inlet 420, and supplied with air via openings 430. The fuel and air mix within chamber 410, and this air-fuel mixture is sparked by a spark plug 440, to produce a flame within chamber 410. The height of the flame will depend on the pressure of the fuel entering through fuel inlet 420. As discussed above, this fuel pressure is controlled by TAPC system 260. As the fuel pressure is increased, the flame will extend out of chamber 410 in direction F, which may correspond to penetration of the flame radially into combustion chamber 136.

If the fuel pressure is too low, the height of the flame may not even extend beyond the top of chamber 410, or may extend beyond the top of chamber 410 but not sufficiently high to ignite combustor 130. On the other hand, if the fuel pressure is too high, the height of the flame may extend too high and blow out. In either case, combustor 130 may fail to ignite. Since the height of the flame is determined by the fuel pressure, the range R of fuel pressures directly translates into a range of flame heights, defined by a first height H1, corresponding to fuel pressure P1, at the bottom of range R and a second height H2, corresponding to fuel pressure P2, at the top of range R.

Thus, as the fuel pressure is modulated between fuel pressures P1 and P2, according to the modulation profile, the height of the flame, extending out of chamber 410, will be proportionally modulated between flame heights H1 and H2. In other words, the operation of TAPC system 260, according to the modulation profile, produces a flame height that changes according to the modulation profile. For example, if the modulation profile is sinusoidal, the flame height will change sinusoidally over time. If the modulation profile is V-shaped, the flame height will change in a V-shaped manner over time. If the modulation profile is stepped, the flame height will change in a step-wise manner over time. More generally, the flame height will follow the shape and frequency of the modulation profile.

Figure 5:
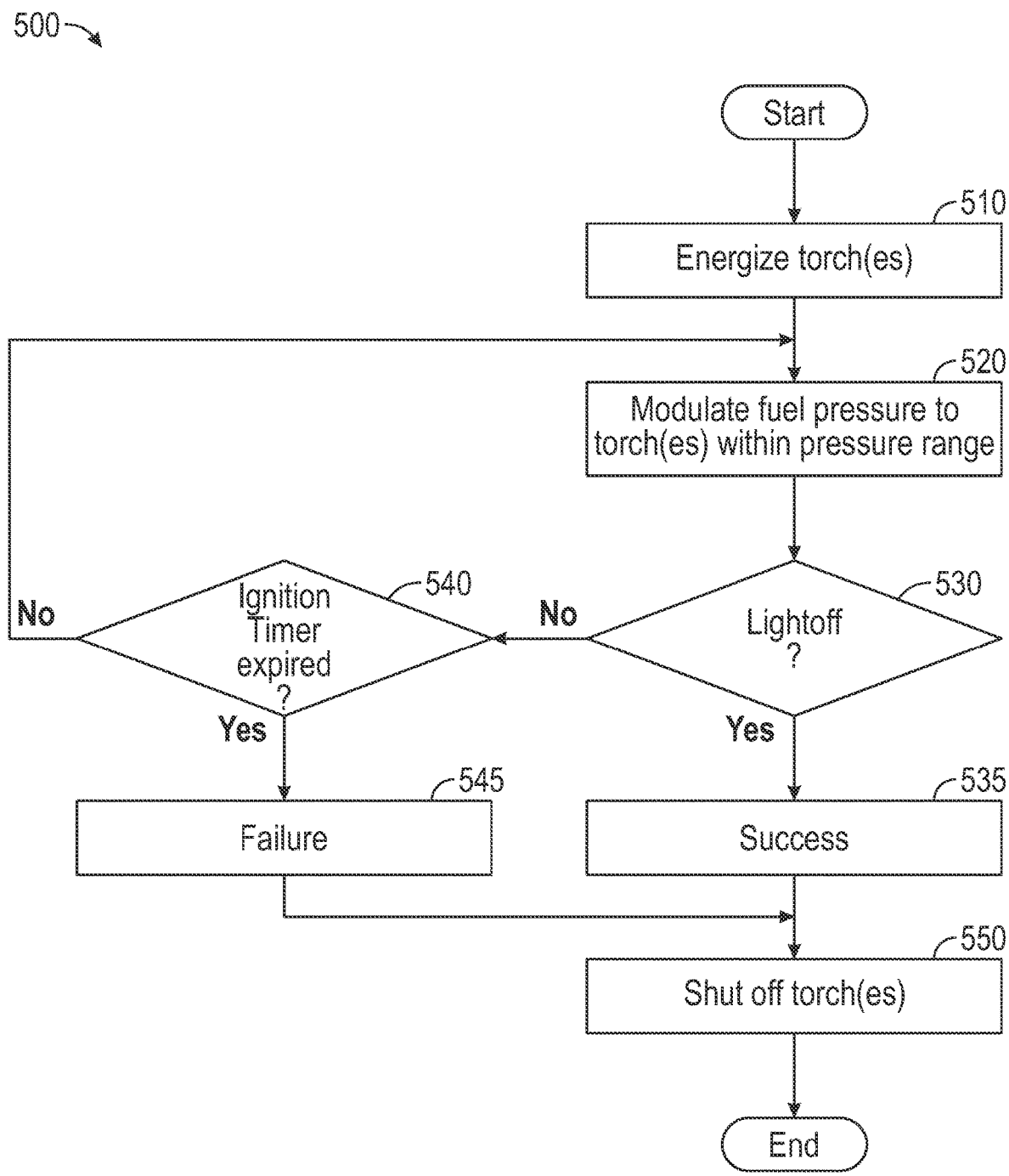
FIG. 5 illustrate an ignition process, according to an embodiment.

FIG. 5 illustrate an ignition process 500, according to an embodiment. While process 500 is illustrated with a certain arrangement and ordering of subprocesses, process 500 may be implemented with fewer, more, or different subprocesses and a different arrangement and/or ordering of subprocesses. Thus, for example, one or more of the described subprocesses may be omitted and/or one or more other subprocesses may be added. In addition, it should be understood that any subprocess, which does not depend on the completion of another subprocess, may be executed before, after, or in parallel with that other independent subprocess, even if the subprocesses are described or illustrated in a particular order. Process 500 may be implemented by a controller that controls one or more components of system 200, including TAPC system 260.

In subprocess 510, each torch 400 is energized. In particular, TAPC system 260 is set to output fuel at a first fuel pressure (e.g., P1). The fuel at this first fuel pressure flows into chamber 410 via fuel inlet 420 and mixes with air flowing into chamber 410 via openings 430. Then, the air-fuel mixture in chamber 410 of each torch 400 is sparked by spark plug 430. This produces a flame with a height corresponding to the first fuel pressure (e.g., flame height H1 corresponding to fuel pressure P1).

In subprocess 520, the fuel pressure to each torch 400 is modulated within a pressure range R. For example, TAPC system(s) 260 may be actuated to control the pressure of fuel exiting the flow control valve and entering fuel inlet 420 of each torch 400, such that the fuel pressure follows a modulation profile within a range R. As discussed elsewhere herein, the modulation profile may be sinusoidal, V-shaped, stepped, and/or the like. Since the fuel pressure determines the flame height of torch 400, the modulation of the fuel pressure by each TAPC system 260 also modulates the flame height produced by the respective torch 400. Consequently, the flame height follows the modulation profile, cyclically traversing a range R of heights.

As discussed elsewhere herein, in an embodiment that utilizes a plurality of torches 400, the modulation profiles for the torches 400 may be the same or different. If the modulation profiles are the same, the flame heights produced by torches 400 will typically be the same, all else being equal. If the modulation profiles are identical in shape but different in frequency and/or phase, the flame heights produced by torches 400 may have the same cycles C, but offset from each other in time. If different in shape, the flame heights produced by torches 400 will have different cycles C altogether, regardless of whether or not the frequencies and/or phases are identical.

In subprocess 530, it is determined whether or not combustor 130 has achieved lightoff. This determination may be based on a measure of downstream temperature, received from one or more temperature sensors within gas turbine engine 100. For example, if the measured temperature satisfies a threshold, subprocess 530 may determine that lightoff has been achieved, whereas if the measured temperature does not satisfy the threshold, subprocess 530 may determine that lightoff has not been achieved. In this case, the T5 temperature may be used. The T5 temperature refers to the temperature of working fluid F after combustion in combustor 130 and prior to entering turbine 140. If the T5 temperature is below a threshold (e.g., less than 400 degrees Fahrenheit), subprocess 530 may determine that lightoff has not been achieved. Conversely, if the T5 temperature is above the threshold (e.g., greater than or equal to 400 degrees Fahrenheit), subprocess 530 may determine that lightoff has been achieved. When determining that lightoff has not been achieved (i.e., "No" in subprocess 530), process 500 may proceed to subprocess 540. Otherwise, when determining that lightoff has been achieved (i.e., "Yes" in subprocess 530), process 500 may indicate success in subprocess 535 (e.g., to an operator or overarching control system) and proceed to subprocess 550. It should be understood that subprocess 530 may be performed continuously or continually while TAPC system 260 is modulating the fuel pressure in subprocess 520.

In subprocess 540, it is determined whether or not an ignition timer has expired. The ignition timer expires whenever a predefined time period has passed without lightoff being detected in subprocess 530. As an example, the predefined time period may be ten seconds. When determining that the ignition timer has not expired (i.e., "No" in subprocess 540), the fuel pressure may continue to be modulated in subprocess 520. Otherwise, when determining that the ignition timer has expired (i.e., "Yes" in subprocess 540), process 500 may indicate failure in subprocess 545 (e.g., to an operator or overarching control system) and proceed to subprocess 550. It should be understood that subprocess 540 may be performed continuously or continually while TAPC system 260 is modulating the fuel pressure in subprocess 520.

In subprocess 550, each torch 400 is shut off. For example, TAPC system(s) 260 may control the flow control valve to shut off the flow of fuel, such that no fuel reaches fuel inlet 420 of each torch 400. Consequently, the flame of torch(es) 400 will dissipate. At this point, if lightoff has been achieved, gas turbine engine 100 may be accelerated to full operational mode.

Figure 6:
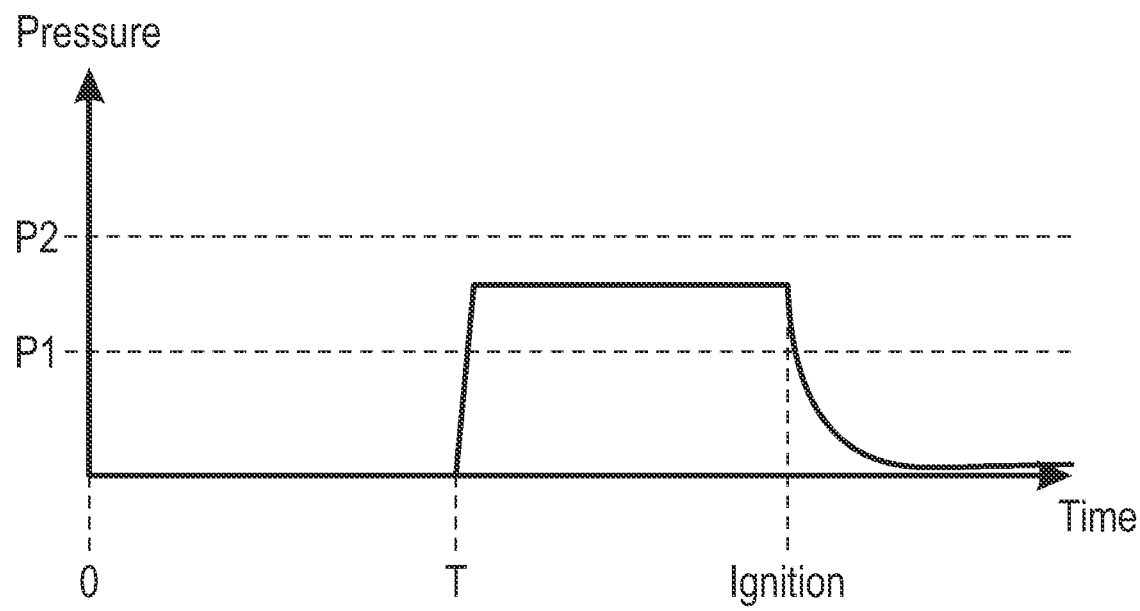
FIG. 6 illustrates the fuel pressure at a torch over time during a typical ignition, according to an example.

FIG. 6 illustrates the fuel pressure at torch 400 over time during a typical ignition, according to an example. At a time T, the fuel pressure to torch 400 is ramped up from an initial value (e.g., zero) to a set value within the ideal range (e.g., in the middle of the ideal range). This fuel pressure is maintained at or near a constant value until either lightoff is detected, indicating a successful ignition, or the ignition timer expires, indicating a failed ignition. In either case, the fuel to torch 400 may be shut off, such that the fuel pressure drops back to or near the initial value (e.g., zero).

Figure 7:
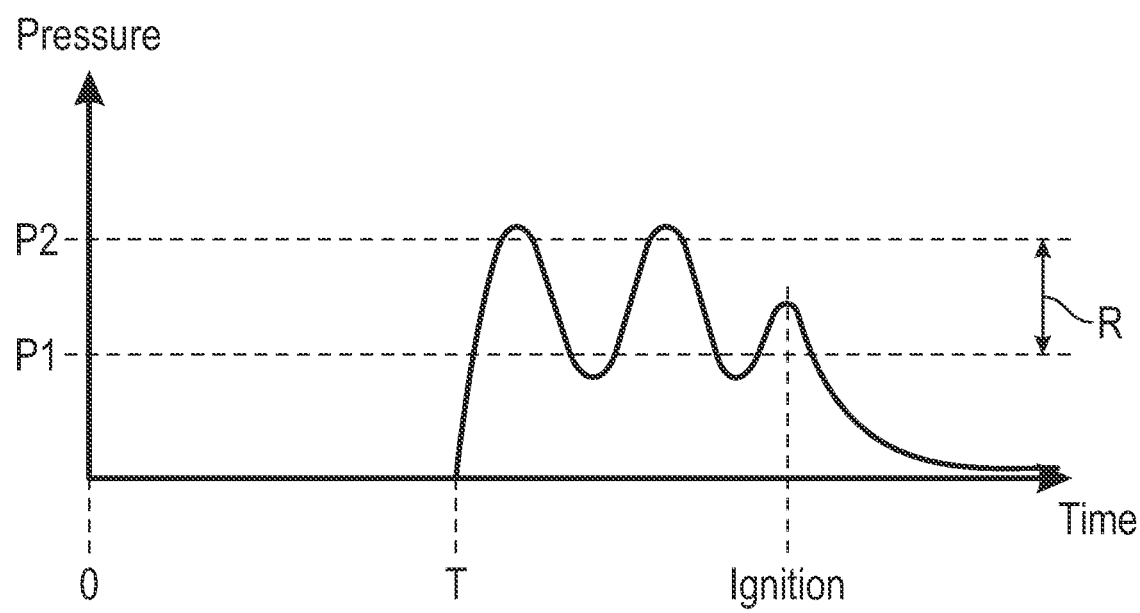
FIG. 7 illustrates the fuel pressure at a torch over time during ignition, according to an embodiment.

FIG. 7 illustrates the fuel pressure at torch 400 over time during an ignition, according to an embodiment. At a time T, the fuel pressure to torch 400 is ramped up from an initial value (e.g., zero) and modulated across the range R, according to the modulation profile implemented by TAPC system 260. In the illustrated example, the modulation profile is sinusoidal. However, it should be understood that other modulation profiles are possible. The modulation may continue until either lightoff is detected (e.g., in subprocess 530), indicating a successful ignition, or the ignition timer expires (e.g., in subprocess 540), indicating a failed ignition. In either case, the fuel to torch may be shut off, such that the fuel pressure drops back to or near the initial value (e.g., zero).

Figure 8:
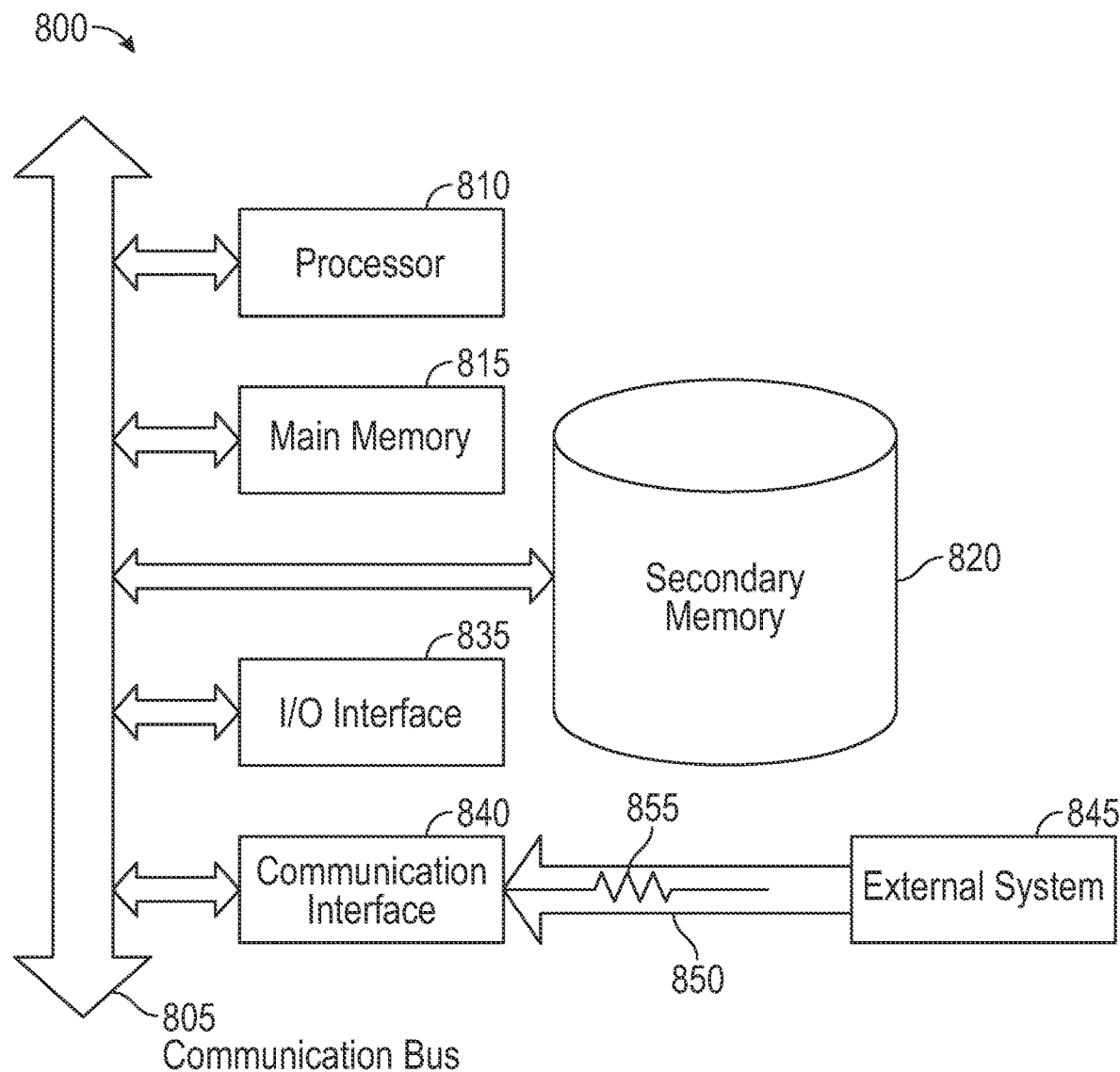
FIG. 8 illustrates an example controller that may be used to implement the ignition process, according to an embodiment.

FIG. 8 illustrates an example controller 800 that may be used to implement, among other things, ignition process 500, according to an embodiment. Controller 800 may be used to control one or more of the components of system 200. For example, controller 800 may be communicatively coupled to the actuator or a sub-controller of TAPC system 260, or controller 800 may be the sub-controller of TAPC system 260. Controller 800 may receive one or more parameters or control signals, and control the actuator of any of the disclosed components (e.g., to transition valves between open and closed states) of system 200, including TAPC system 260, or other subsystems of gas turbine engine 200, based on the parameter(s) and/or control signal(s). Parameter(s) may be received from one or more sensors (e.g., pressure sensor(s) 215, resistance temperature detector(s) 225, engine speed sensor, etc.), installed at position(s) along the fuel path and/or elsewhere within gas turbine engine 100. Control signal(s) may be received from one or more other control systems of gas turbine engine 100. Each controlled component may comprise its own controller 800, or a single controller 800 may control all components or any subset of components described herein. As one example, controller 800 may receive real-time pressure measurements from pressure sensor 215G and control TAPC system 260 in a closed-loop control process, to ensure that the pressure measurements match a stored modulation profile. In one particular implementation, controller 800 is an Allen-Bradley ControlLogix Controller (e.g., model 5570 or 5580) from Rockwell Automation of Milwaukee, Wisconsin.

Controller 800 may comprise one or more processors 810. Processor(s) 810 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 810. Examples of processors which may be used with controller 800 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors (e.g., PowerQUICC) available from NXP Semiconductors N.V. of Eindhoven, Netherlands, and/or the like.

Processor 810 may be connected to a communication bus 805. Communication bus 805 may include a data channel for facilitating information transfer between storage and other peripheral components of controller 800. Furthermore, communication bus 805 may provide a set of signals used for communication with processor 810, including a data bus, address bus, and/or control bus (not shown). Communication bus 805 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Controller 800 may comprise main memory 815. Main memory 815 provides storage of instructions and data (e.g., a data structure defining a modulation profile) for programs executing on processor 810, such as a program implementing process 500. It should be understood that programs stored in the memory and executed by processor 810 may be written and/or compiled according to any suitable language, including without limitation C/C++, Java, JavaScript, Perl, Python, Visual Basic, .NET, and the like. Main memory 815 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Controller 800 may comprise secondary memory 820. Secondary memory 820 is a non-transitory computer-readable medium having computer-executable code and/or other data (e.g., a data structure defining a modulation profile, a computer program implementing process 500, etc.) stored thereon. In this description, the term "computer-readable medium" is used to refer to any non-transitory computer-readable storage media used to provide computer-executable code and/or other data to or within controller 800. The computer software stored on secondary memory 820 is read into main memory 815 for execution by processor 810. Secondary memory 820 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Controller 800 may comprise an input/output (I/O) interface 835. I/O interface 835 provides an interface between one or more components of controller 800 and one or more input and/or output devices. For example, I/O interface 835 may receive the output of one or more sensors (e.g., pressure sensor(s) 215, resistance temperature detector(s) 225, etc.), and/or output control signals to one or more of the components described herein. In one particular implementation, I/O interface 835 may implement ControlNet™, as offered by Rockwell Automation.

Controller 800 may comprise a communication interface 840. Communication interface 840 allows signals, such as data and software, to be transferred between controller 800 and external devices, networks, or other information sources. For example, computer-executable code and/or data may be transferred to controller 800, over one or more networks, from a network server via communication interface 840. Examples of communication interface 840 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 800 with a network or another computing device. Communication interface 840 preferably implements industry-promulgated protocol standards, such as Data Highway Plus (DH+), Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 840 is generally in the form of electrical communication signals 855. These signals 855 may be provided to communication interface 840 via a communication channel 850 between communication interface 840 and an external system 845. In an embodiment, communication channel 850 may be a wired or wireless network, or any variety of other communication links. Communication channel 850 carries signals 855 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 815 and/or secondary memory 120. Computer-executable code can also be received from an external system 845 via communication interface 840 and stored in main memory 815 and/or secondary memory 820. Such computer-executable code, when executed by processor(s) 810, enable controller 800 to perform the various control functions (e.g., process 500 or one or more subprocesses of process 500) of the disclosed embodiments.

INDUSTRIAL APPLICABILITY

Typically, the fuel pressure to a torch 400 is set to an ideal value for igniting an air-fuel mixture in combustor 130 of gas turbine engine 110. However, the actual fuel pressure supplied to torch 400 may differ due to modifications, drift, changes in ambient temperature or pressure, fuel composition, and/or the like. This may result in the failure of combustor 130 to ignite. In some cases, the rate of ignition failures can be as high as 50%.

Disclosed embodiments introduce a TAPC system 260 into the flow path of fuel to torch 400. TAPC system 260 may be controlled (e.g., via an actuator that actuates a globe valve) to modulate the fuel pressure of the fuel supplied to torch 400, according to a modulation profile. The modulation profile may traverse a range of fuel pressures in each of one or a plurality of sinusoidal, V-shaped, stepped, or other-shaped cycles. Since the height of the flame, penetrating into combustion chamber 136 from torch 400, is determined by the fuel pressure, the flame height produced by torch 400 also follows this modulation profile. Traversal of the range of fuel pressures ensures that, regardless of the particular environment, the ideal fuel pressure, and therefore, the ideal flame height, is achieved at least once, and potentially, twice per cycle. This can help increase the rate of successful ignitions to above 99.5%.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of turbomachine. Hence, although the present embodiments are, for convenience of explanation, depicted and described as being implemented in a gas turbine engine, it will be appreciated that it can be implemented in various other types of engines and machines with torches, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A system for torch control for achieving ignition in a turbomachine, the system comprising:
    one or more torches;
    at least one torch active pressure control (TAPC) system in fluid communication with at least one of the one or more torches, wherein the TAPC system is configured to set a fuel pressure of fuel that is supplied to the at least one torch; and
    a controller configured to actuate the at least one TAPC system:
        to modulate the fuel pressure that is supplied to the at least one torch, according to a modulation profile that traverses a range of fuel pressures thereby producing a range of flame heights of the at least one torch, and
        to shut off flow of the fuel to the one or more torches after a lightoff of the turbomachine.

2. The system of claim 1, wherein the modulation profile is sinusoidal.

3. The system of claim 1, wherein the modulation profile is V-shaped.

4. The system of claim 1, wherein the modulation profile is stepped.

5. The system of claim 1, wherein the modulation profile traverses a range of fuel pressures in each of one or more cycles.

6. The system of claim 5, wherein the one or more cycles are a plurality of cycles.

7. The system of claim 1, wherein the controller is further configured to, while actuating the at least one TAPC system to modulate the fuel pressure, detect whether or not the lightoff has been achieved in a combustor of the turbomachine.

8. The system of claim 7, wherein detecting whether or not the lightoff has been achieved comprises determining whether or not a temperature of working fluid, downstream from the at least one torch, satisfies a threshold.

9. The system of claim 7, further comprising one or more temperature sensors within the turbomachine and wherein the controller is further configured to detect that the lightoff has been achieved based on a measure of downstream temperature received from the one or more temperature sensors.

10. The system of claim 1, wherein the controller is further configured to, prior to actuating the at least one TAPC system to modulate the fuel pressure, energize the at least one torch.

11. The system of claim 7, wherein the controller is further configured to, while actuating the at least one TAPC system to modulate the fuel pressure, detect whether or not an ignition timer has expired.

12. The system of claim 11, wherein the controller is further configured to, when detecting that the ignition timer has expired, shut off the at least one torch.

13. The system of claim 1, wherein the at least one TAPC system is a plurality of TAPC systems, wherein the one or more torches are a plurality of torches, and wherein each of the plurality of TAPC systems is upstream from a respective one of the plurality of torches and configured to set the fuel pressure of fuel that is supplied to the respective torch, and wherein the controller is configured to actuate each of the plurality of TAPC systems to modulate the fuel pressure that is supplied to the respective torch.

14. The system of claim 13, wherein the controller is configured to actuate each of the plurality of TAPC systems to modulate the fuel pressure that is input to the respective torch, according to a respective modulation profile.

15. A gas turbine engine comprising:
    a compressor;
    the system of claim 1;
    a combustor downstream from the compressor, wherein the combustor comprises a combustion chamber, and wherein each of the one or more torches is configured to produce a flame that penetrates radially into the combustion chamber; and
    a turbine downstream from the combustor.

16. A method for igniting an air-fuel mixture in a combustor, the method comprising, by at least one controller, for each of one or more torches configured to produce a flame that penetrates into a combustion chamber of the combustor:
    energizing the torch;
    modulating a fuel pressure of fuel that is supplied to the torch, according to a modulation profile that traverses a range of fuel pressures to produce a range of flame heights of the torch;
    detecting whether or not lightoff has been achieved in the combustor; and
    when detecting that the lightoff has been achieved in the combustor, shutting off the torch.

17. The method of claim 16, wherein the modulation profile is either sinusoidal, V-shaped, or stepped.

18. The method of claim 16, wherein the modulation profile traverses a range of fuel pressures in each of a plurality of cycles.

19. The method of claim 16, wherein modulating the fuel pressure comprises actuating a flow control valve in a torch active pressure control (TAPC) system, which supplies the fuel to the torch, according to the modulation profile.

20. A system for achieving ignition in a turbomachine comprising:
    a plurality of torches each configured to produce a flame that penetrates into a combustion chamber of a combustor;
    a plurality of torch active pressure control (TAPC) systems, wherein each of the plurality of TAPC systems is in fluid communication with a respective one of the plurality of torches, and wherein each of the plurality of TAPC systems is configured to set a fuel pressure of fuel that is supplied to the respective torch; and
    at least one controller configured to actuate each of the plurality of TAPC systems to
        energize the respective torch,
        modulate a fuel pressure of fuel that is supplied to the respective torch, according to a modulation profile that traverses a range of fuel pressures to vary the flame height of the respective torch, and
        detect whether or not lightoff has been achieved in the combustor; and
        when detecting that the lightoff has been achieved in the combustor, shut off the respective torch.

* * * * *